Jan. 14, 1958  A. S. MOOREHEAD  2,819,769
HYDRAULIC POWER STEERING MECHANISM
Filed Sept. 22, 1955  2 Sheets-Sheet 1
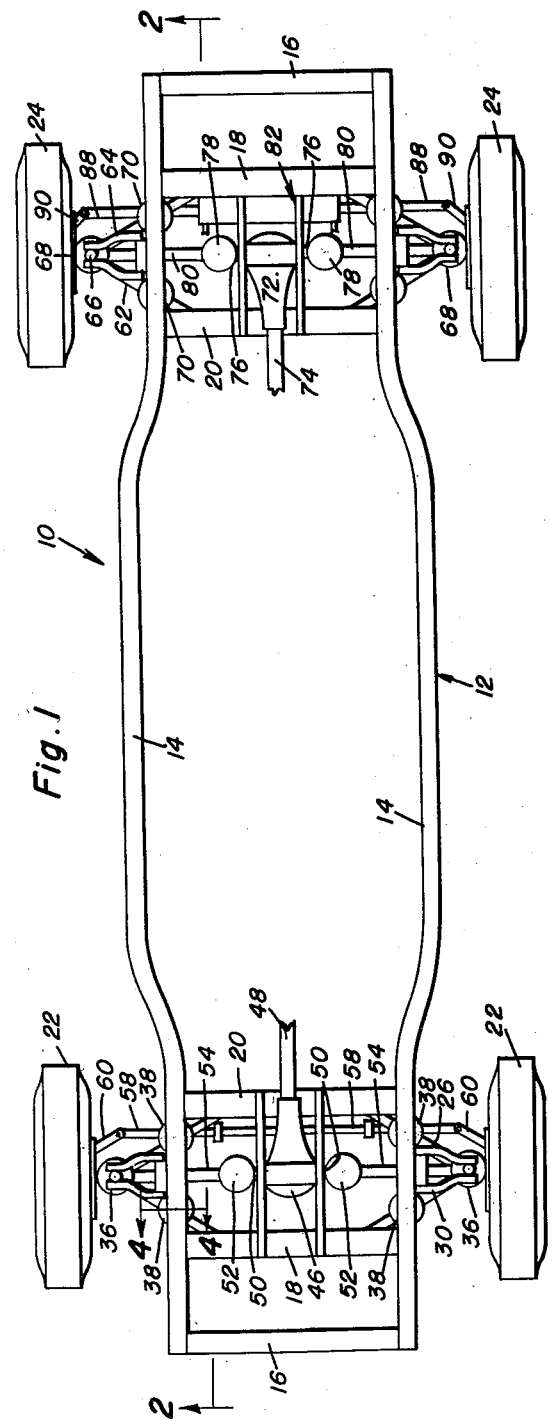
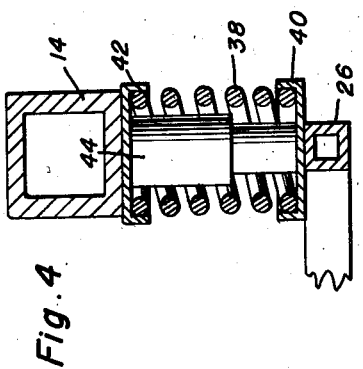
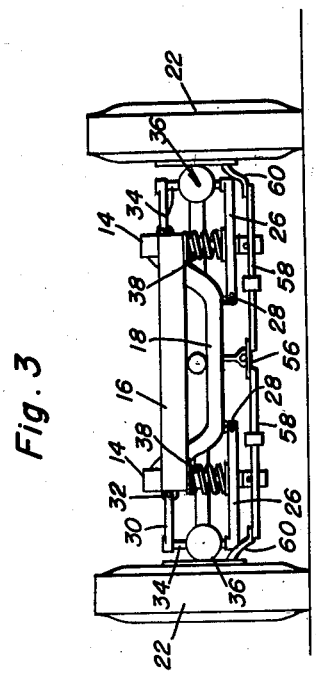
Alexander S. Moorehead
INVENTOR.
BY Jan. 14, 1958 A. S. MOOREHEAD 2,819,769
HYDRAULIC POWER STEERING MECHANISM
Filed Sept. 22, 1955 2 Sheets-Sheet 2
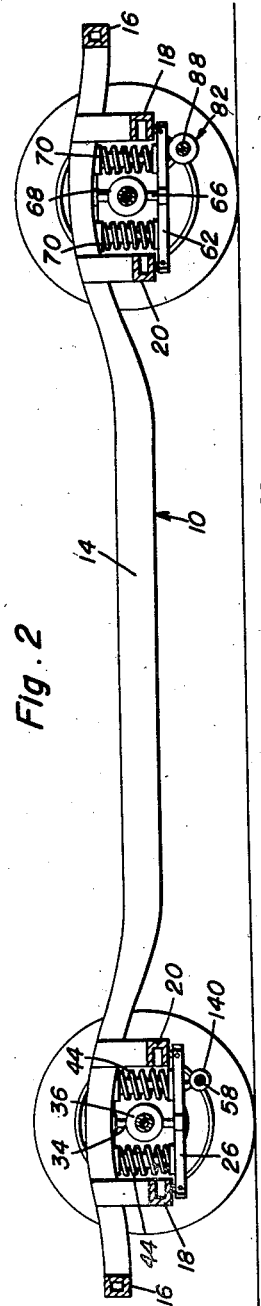
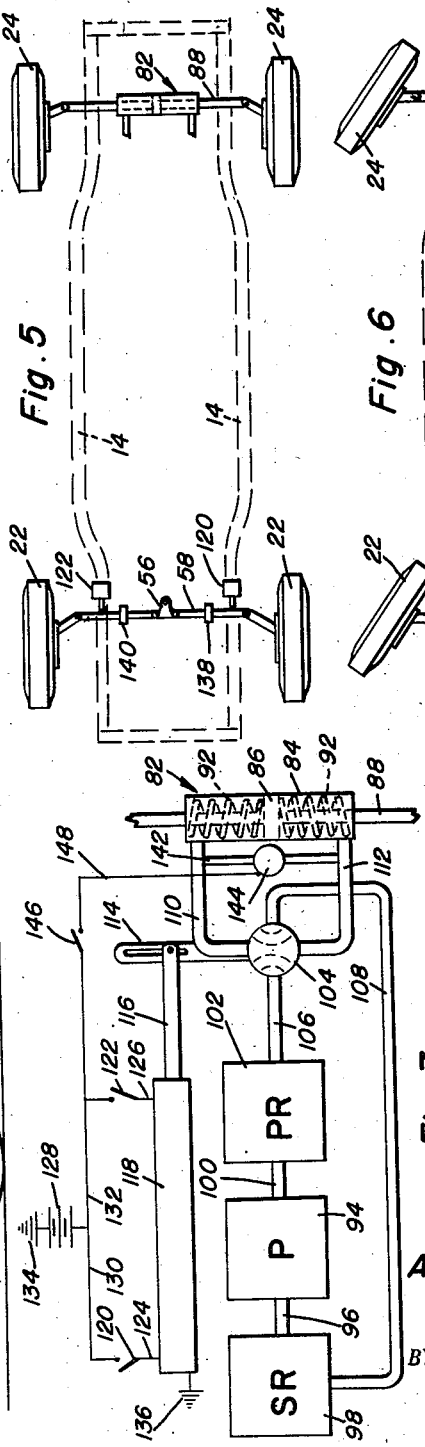
Alexander S. Moorehead
INVENTOR.

United States Patent Office 2,819,769
Patented Jan. 14, 1958

2,819,769
HYDRAULIC POWER STEERING MECHANISM
Alexander S. Moorehead, Willow Creek, Calif.
Application September 22, 1955, Serial No. 535,924
3 Claims. (Cl. 180—79.2)

This invention relates to new and useful improvements in motor vehicles, and more specifically, to an improved vehicle wheel suspension and control.

A present day vehicle is still difficult to park and move into relatively narrow spaces due to the fact that the front wheels only thereof are steerable. One of the main problems in vehicle design is to provide the proper control for four wheel steering. It is therefore the primary object of this invention to provide a vehicle chassis which includes four steerable wheels, the rear wheels of the vehicle normally being spaced and being turnable with the front wheels only when it is desired to move the vehicle sideways in a crabbing action.

Another object of this invention is to provide an improved vehicle suspension and control which includes normally straight rear wheels and turnable front wheels, the rear wheels also being mounted for turning movement and being controlled in response to the turning of the front wheels beyond a predetermined point.

Still another object of this invention is to provide an improved vehicle suspension for a vehicle which includes independent suspension of all of the wheels of the vehicle, both front and rear, the vehicle suspension including a lower control arm whose movement is resisted by a pair of coil springs, each coil spring being provided with a separate shock absorber.

A further object of this invention is to provide an improved vehicle wheel suspension for a vehicle of the four wheel drive type, each of the vehicle wheels being individually sprung and being steerable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the vehicle chassis which is the subject of this invention and shows the general suspension of the front and rear wheels thereof;

Figure 2 is a longitudinal vertical sectional view taken through the chassis of Figure 1 and shows the general details of the wheel suspension thereof;

Figure 3 is a front elevational view of the vehicle chassis of Figure 1 and shows the general arrangement of the suspension of the front wheels thereof;

Figure 4 is an enlarged fragmentary transverse vertical sectional view taken substantially upon the plane indicated by the section line 4—4 of Figure 1 and shows the mounting of shock means for one of the lower control arms;

Figure 5 is a schematic view on a reduced scale showing the normal relationship of the vehicle wheels, the frame being shown in dotted lines;

Figure 6 is a schematic view similar to Figure 5 and shows the wheels turned to effect a crabbing movement of the vehicle of which they form a part; and Figure 7 is a schematic view of the control system for the rear wheels.

Referring now to the drawings in detail, it will be seen that there is illustrated the chassis which is the subject of this invention, the chassis being referred to in general by the reference numeral 10. The chassis 10 includes a frame which is referred to in general by the reference numeral 12. The frame 12 is formed of a pair of longitudinally extending frame rails 14 which are connected together at intermediate points by transverse frame members 16, 18 and 20, the arrangement of the frame members at the forward and rear ends of the frame rails 14 being the same. The frame rails 14 are preferably of the box type.

Supporting the frame 12 is a pair of front wheels 22 and a pair of rear wheels 24. Each of these four wheels is independently sprung and steerable.

Carried by the transverse frame members 18 and 20 at the forward end of the frame 12 and at each side thereof is a lower control arm 26 which is of a generally V-shaped outline in plan. The ends of the control arm 26 are pivotally connected to the frame members 18 and 20, as at 28. Carried by each of the frame rails 14 adjacent the forward ends thereof is an upper control arm 30 which is aligned with the lower control arm 26. Each upper control arm 30 is hingedly secured to its respective frame rail 14, as at 32.

Extending between the outer ends of the control arms 26 and 30 and connected thereto by means of a spherical or ball joint is a kingpin type member 34. Carried by each of the members 34 intermediate the ends thereof is an outer housing member of a universal joint which is referred to in general by the reference numeral 36. Each universal joint 36 will include a stub axle (not shown) carrying one of the front wheels 22.

Referring now to Figures 1 and 4 in particular, it will be seen that each of the lower control arms 26 is provided with a pair of coil springs 38. Each coil spring 38 rests upon a fitting 40 carried by one-half of the lower control arm 26. The upper end of each spring 38 rests in a bracket 42 carried by the underside of one of the frame rails 14. In order to increase the riding qualities of the chassis 10, there is mounted within each coil spring 38 a tubular shock absorber 44.

In order that the front wheels 22 may be driven, there is suitably carried by the forward portion of the frame 12 a differential assembly 46. The differential assembly 46 includes a drive shaft 48 and stub axle 50. Carried by the outer ends of the stub axles 50 are universal joints 52. Extending between the universal joints 52 and the universal joints 36 are other axle assemblies 54.

The front ends of the chassis 10 is of the center steering type and includes a center control arm 56, which is best illustrated in Figure 5. Extending from the center control arm 56 are suitable tie rods 58 which are connected at their ends to steering arms 60 of the individual front wheels 22. Although they have not been illustrated, it is to be understood that there will be connected to the center steering bracket 56 a drag link and a steering box assembly.

The construction of the rear of the chassis 10 is similar to that at the front, and each rear wheel 24 is supported by a lower control arm 62 and an upper control arm 64. Extending between the control arms 62 and 64 is a kingpin-like member 66 which is connected to the control arms 62 and 64 by ball joints. Carried by the kingpin-like member 66 is a universal joint 68 which includes a stub axle (not shown) supporting each of the rear wheels 24. Spring shock absorber assemblies 70 similar to those described with respect to the front wheels 22 are utilized.

In order that the rear wheels 24 may be driven, carried by the frame 12 is a rear differential assembly 72. The rear differential assembly 72 includes a drive shaft 74 and stub axle assemblies 76. Carried by the outer end of each stub axle assembly 76 is a universal joint 78. Extending between each universal joint 78 and its associated universal joint 68 is a stub axle assembly 80.

In order that the rear wheels 24 may be selectively turned and at the same time normally retained in a straight position, there is provided a hydraulic motor which is referred to in general by the reference numeral 82. As is best illustrated in Figure 7, the hydraulic motor 82 includes a cylinder 84 in which there is mounted a piston 86. The piston 86 is carried intermediate the ends of a tie rod 88 which extends throughout the length of the cylinder 84. The outer ends of the tie rod 88 are connected to steering arms 90 of the rear wheels 24.

In order to effect the normal straight positioning of the rear wheels 24, there is mounted in the cylinder 84 a pair of coil springs 92. The coil springs 92 are disposed on opposite sides of the piston 86 and are sufficient to return the piston 86 to a center position wherein the rear wheels 24 will be disposed in straight positions, such as illustrated in Figure 5.

In order to effect turning of the rear wheels 24 as desired, there is provided a hydraulic system which includes a pump 94. The pump 94 is connected by hydraulic line 96 to a supply reservoir 98. It is also connected by a line 100 to a pressure reservoir 102.

The hydraulic system includes a four-way valve 104 which is connected to the pressure reservoir 102 by a hydraulic line 106 and to the supply reservoir by a line 108. There are also provided lines 110 and 112 which are connected to opposite ends of the cylinder 84.

Operation of the four-way control valve 104 is accomplished by means of a control arm 114. Connected to the control arm 114 is a plunger rod 116 of a reversible electromagnetic device 118.

The electromagnetic device 118 is controlled by a pair of switches 120 and 122 which are connected thereto by wires 124 and 126. Switches 120 and 122 are connected to a battery 128, which should be a part of the vehicle of which the chassis 10 is a part, by means of wires 130 and 132. The battery 128 is grounded, as at 134, and the electromagnetic device 118 is grounded, as at 136.

Referring now to Figure 5 in particular, it will be seen that there is carried by each of the frame rails 14 one of the switches 120 and 122. In order to control actuation of the switches 120 and 122, the tie rods 58 are provided with stop collars 138 and 140.

In the normal operation of the chassis 10, the front wheels 22 are steerable to control the turning of the chassis around any desired corner. However, when the front wheels 22 are turned to a maximum turning position, such as utilized in parking, then one of the collars 138 and 140 will strike one of the switches 120 and 122 to effect the closing of the same. This will result in the actuation of the electromagnetic device 118 to pull the control lever 114 around. This will result in the four-way valve 104 communicating the proper end of the cylinder 84 with the pressure reservoir 102. As a result, the rear wheels 24 will turn in the same direction as the front wheels 22 and to substantially the same amount, as is best illustrated in Figure 6. Then, a vehicle may be driven substantially sideways in a crabbing action into a parking place or any other desired place.

Any simple type of control may be utilized to return the rear wheels 24 to their original straight positions illustrated in Figure 5. One of the simplest types is to provide a by-pass line 142 in the hydraulic lines 110 and 112. In the by-pass line 142 will be an electrically controlled shut-off valve 144 which is normally closed. The valve 144 is manually controlled by means of a switch 146 mounted in a wire 148 which will be suitably connected to the battery 128. The valve 144, of course, will be grounded. Further, the electromagnetic device 118 should be of the spring loaded type so as to return to an initial position when the switches 120 and 122 are opened. Then, once the vehicle has either been backed out of the parking place or the wheels turned in the opposite direction to drive out forwardly, the rear wheels 24 may be returned to their normal straight positions by turning the front wheels 22 to their normal straight positions. This will result in the turning of the four-way control valve 104 to the position illustrated in Figure 7 wherein the flow of fluid is prevented. Then, the valve 144 is opened to permit equalizing of pressures on opposite sides of the piston 86. The springs 92 will then return the piston 86 to a neutral position. The valve 144 may then be closed and the springs 92 together with hydraulic pressure on both sides of the piston 86 will retain the rear wheels 24 in their normal straight positions.

From the foregoing description of the present invention, it will be readily apparent that there has been devised a novel suspension system for a vehicle wherein all four wheels may be driven and at the same time individually sprung and steered. Further, it will be readily apparent that there has been devised a novel steering system which will permit the normal operation of the steering of the vehicle except when parking wherein all of the four wheels may be turned to effect a crabbing operation of the vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A vehicle chassis assembly comprising a frame, front and rear wheels supporting said frame, means mounting all of said wheels for steering movement, steering means for said front wheels including tie rods, a hydraulic system carried by said frame including a hydraulic motor, a hydraulic control valve, and a pressure supply, steering means for said rear wheels including said hydraulic motor and a tie rod connected to said hydraulic motor of said rear wheels, and means carried by said frame for engagement by said front wheel tie rods upon turning of said front wheels to a predetermined angle to actuate said control valve to effect turning of said rear wheels.

2. The vehicle chassis assembly of claim 1 wherein each of said front and rear wheels is independently sprung.

3. A vehicle chassis assembly comprising a frame, front and rear wheels supporting said frame, all of said wheels being steerable, front wheel steering means including tie rods connected to said front wheels, rear wheel steering means, said rear wheel steering means including a tie rod extending between said rear wheels, a fluid motor disposed intermediate the ends of said rear wheel tie rod, said fluid motor including a piston carried by said rear wheel tie rod, a hydraulic system connected to said hydraulic motor, and control means for said hydraulic motor for operating said hydraulic motor to turn said rear wheels upon turning of said front wheels beyond a predetermined angle, said control means including a control valve for said hydraulic motor, and controls for said control valve, said controls including an electrical operator for said control valve and switches operating said electrical operator, said switches being mounted on said frame adjacent said front wheel tie rods, stop members on said front wheel tie rods for engaging said switches to operate said electrical operator.

References Cited in the file of this patent
UNITED STATES PATENTS

| 859,235 | Macfarren | July 9, 1907 |
| 1,093,131 | Hays | Apr. 14, 1914 |
| 1,951,147 | Greist | Mar. 13, 1934 |
| 2,103,624 | Lester | Dec. 28, 1937 |
| 2,232,105 | Skok | Feb. 18, 1941 |
| 2,259,264 | Parsons | Oct. 14, 1941 |
| 2,319,880 | Pulleyblank | May 25, 1943 |
| 2,512,979 | Strother | June 27, 1950 |
| 2,728,404 | Peterson | Dec. 27, 1955 |